United States Patent
Heffley et al.

(10) Patent No.: US 8,219,420 B1
(45) Date of Patent: Jul. 10, 2012

(54) METHOD AND APPARATUS FOR PROVIDING ACCESS TO HEALTHCARE FUNDS

(75) Inventors: Michael P. Heffley, Amherst, NY (US); Robert M. States, East Amherst, NY (US); Michael J. Colson, East Amherst, NY (US)

(73) Assignee: Manning & Napier Information Services, LLC, Amherst, NY (US)

( * ) Notice: Subject to any disclaimer, the term of this patent is extended or adjusted under 35 U.S.C. 154(b) by 2493 days.

(21) Appl. No.: 10/319,297

(22) Filed: Dec. 13, 2002

(51) Int. Cl.
  *G06Q 40/00* (2012.01)
(52) U.S. Cl. ........................................... 705/4
(58) Field of Classification Search .............. 705/2–4
  See application file for complete search history.

(56) References Cited

U.S. PATENT DOCUMENTS

| | | | |
|---|---|---|---|
| 5,550,734 A | 8/1996 | Tarter et al. | |
| 5,704,044 A | 12/1997 | Tarter et al. | |
| 5,839,118 A | 11/1998 | Ryan et al. | |
| 6,012,035 A * | 1/2000 | Freeman et al. | 705/2 |
| 6,208,973 B1 * | 3/2001 | Boyer et al. | 705/2 |
| 7,039,593 B2 * | 5/2006 | Sager | 705/4 |
| 2002/0010594 A1 * | 1/2002 | Levine | 705/2 |
| 2002/0128863 A1 * | 9/2002 | Richmond | 705/2 |

OTHER PUBLICATIONS www.evolutionbenefits.com, Nov. 11, 2002.
www.medibank.com, Nov. 11, 2002.
www.zadall.com, Mar. 19, 2003.

* cited by examiner

*Primary Examiner* — Sheetal R Rangrej
(74) *Attorney, Agent, or Firm* — Simpson & Simpson, PLLC

(57) ABSTRACT

A method and apparatus for coordinating payment of healthcare expenses is disclosed. The method comprises determining a co-payment amount based on a customer's insurance coverage, determining the availability of funds from a plurality of the consumer's prioritized accounts, and deducting at least a portion of the co-payment from the highest priority account having available funds.

5 Claims, 8 Drawing Sheets

METHOD AND APPARATUS FOR PROVIDING ACCESS TO HEALTHCARE FUNDS

FIELD OF THE INVENTION

This invention relates to a method and apparatus for payment for healthcare goods and services. More specifically it relates to a method and apparatus for providing funds and routing payments for healthcare expenses. Even more specifically, the present invention relates to a method and apparatus for providing funds from a plurality of accounts for healthcare expenses.

BACKGROUND OF THE INVENTION

The present method of paying for healthcare expenses partially covered by medical insurance is cumbersome. This is especially true for a consumer wishing to pay for healthcare expenses using pre-tax funds deducted from a flex spending account or health reimbursement arrangement. The healthcare provider must submit a claim for the part of the expense paid for by insurance and charge the customer for the remainder owed (the co-payment). If reimbursement is desired, the customer must save the receipt and submit it to a third party administrator to receive reimbursement, usually with a significant delay. Although attempts have been made to streamline the process, significant inefficiencies remain.

U.S. Pat. No. 6,208,973 discloses a method and apparatus for payment of healthcare expenses. This invention includes substantially real-time claim adjudication such that the consumer is given the amount of their co-payment at the point of service. The consumer then pays using conventional means (cash, credit card, or check, for example). If the consumer wants to use pre-tax dollars from a flex spending account, he must pay out-of-pocket and save the receipts to be reimbursed.

U.S. patent application Ser. No. 09/812,639 (Levine) discloses a method of payment for healthcare expenses wherein a credit card is issued to a customer. The credit card is used to pay for healthcare expenses incurred from a list of approved providers. The invention ensures that the providers receive prompt payment, allowing them to reduce their prices for the consumers who practice the invention. The consumer must then pay the credit card issuer after being billed. As with the above-described invention, if the consumer wants to use pre-tax dollars from a flex spending account, she must pay out-of-pocket and save the receipts to be reimbursed.

The respective websites for Evolution Benefits and Metavante Heathcare Payment Solutions both disclose flex spending account cards. These cards allow a customer to spend money directly from a flex spending account, rather than pay out-of-pocket and seek reimbursement later. However, the system disclosed by Metavante Heathcare Payment Solutions still requires the customer to save the receipts to verify eligibility of the expenses. Further, the account cards only allow spending from the customer's flex spending account. If the customer runs out of money in the flex spending account, she will be forced to pay out-of-pocket, or provide other payment means.

Clearly, then, there is a longfelt need for a method and apparatus to coordinate the payment of healthcare expenses that reduces the costs of the customer, provider, and third party administrator, especially in the case of pre-tax funds being used for healthcare expenses.

SUMMARY OF THE INVENTION

The present invention broadly comprises a method and apparatus for coordinating payment of healthcare expenses. The method comprises determining a co-payment amount based on a customer's insurance coverage, determining the availability of funds from a plurality of the consumer's prioritized accounts, and deducting at least a portion of the co-payment from the highest priority account having available funds.

A general object of the present invention is to provide a method and apparatus to automatically electronically provide co-payments for healthcare expenses from a client's account.

Another object of the present invention is to provide a method and apparatus to provide co-payments from the highest priority client account having available funds.

A further object of the present invention is to provide a method and apparatus to provide direct co-payments from flex spending accounts and health reimbursement arrangements.

These and other objects, features and advantages of the present invention will become readily apparent to those having ordinary skill in the art upon a reading of the following detailed description of the invention in view of the drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

It should be appreciated that, in the detailed description of the invention which follows, like reference numbers on different drawing views are intended to identify identical structural elements of the invention in the respective views.

Healthcare goods and services are currently being distributed in a cumbersome manner, especially with respect to flex spending accounts (FSAs) and health reimbursement arrangements (HRAs). In the present invention, a flex spending account is an account containing pre-tax funds provided by an employee under 26 U.S.C. §105(b) for healthcare expenses. A health reimbursement arrangement is an account containing taxable funds provided by an employer for an employee's healthcare expenses.

Figure 1:
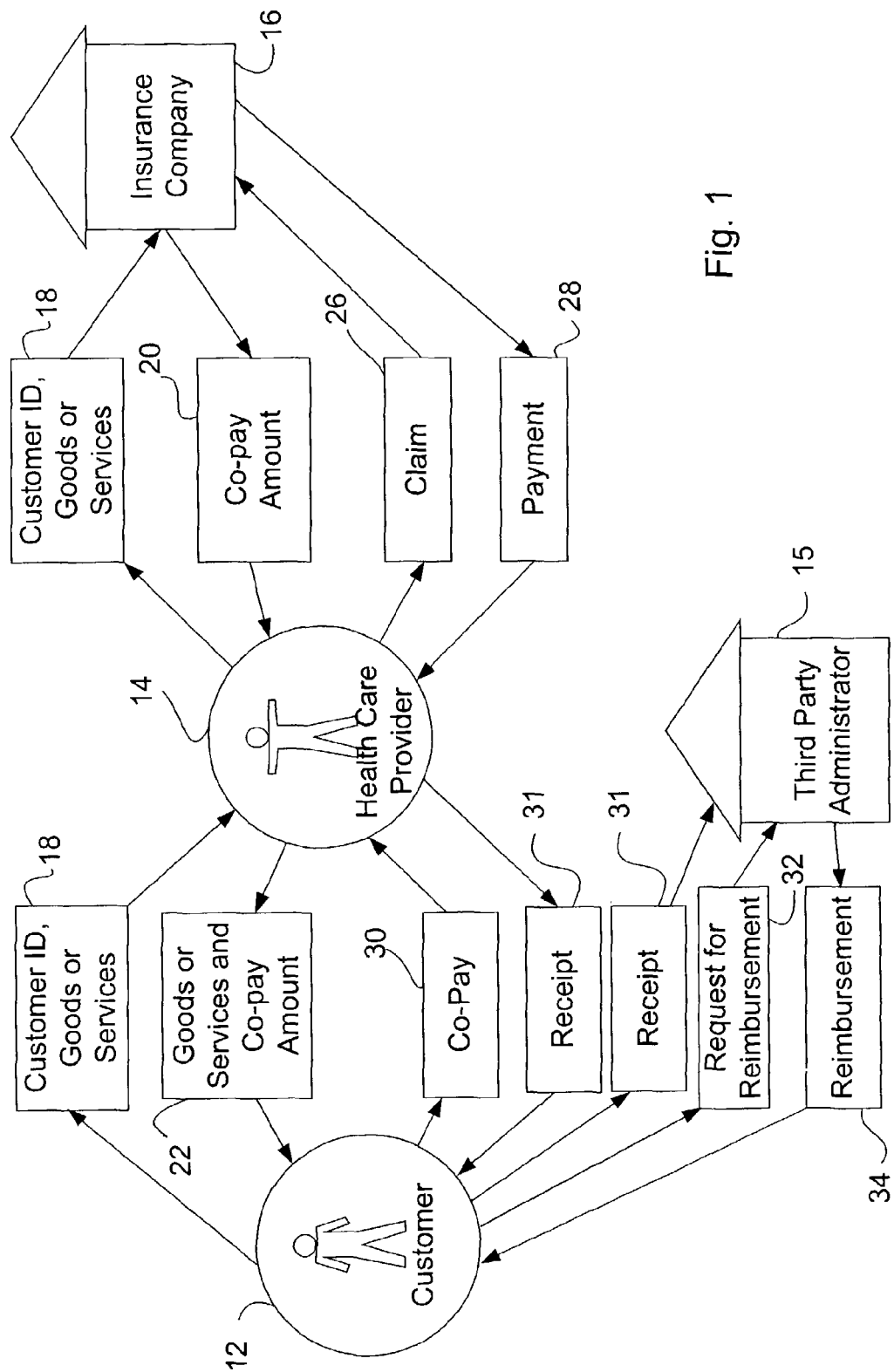
FIG. 1 is a work flow diagram of the present system for providing payment for a healthcare good or service.

A schematic diagram summarizing the present system is shown in FIG. 1. Customer 12 requests a healthcare good or service from provider 14. Customer 12 communicates the good or service needed and the customer's health insurance information 18 to provider 14. Provider 14 then contacts the appropriate insurance company 16 to determine the eligibility of the customer for health insurance benefits by communicating the good or service requested and customer information 18. Insurance company 16 communicates to provider 14 co-payment amount 20 required from the customer for the requested good or service. The provider supplies the good or service to the customer and communicates to the customer co-payment amount 22. The provider then files claim 26 with the insurance company to receive payment 28, the portion of the expense covered by the insurance company. The customer tenders payment of co-pay 30 by check, cash, credit or debt card, or other means known in the art. This is generally shown in U.S. Pat. No. 6,208,973, incorporated by reference herein. If the customer would like the co-payment to come from funds in an FSA or HRA, the customer must save receipt 31 and submit it with request for reimbursement 32 to third party administrator (TPA) 15 who determines that the expense is an eligible heath care expense and then sends reimbursement 34 to the customer.

Figure 2:
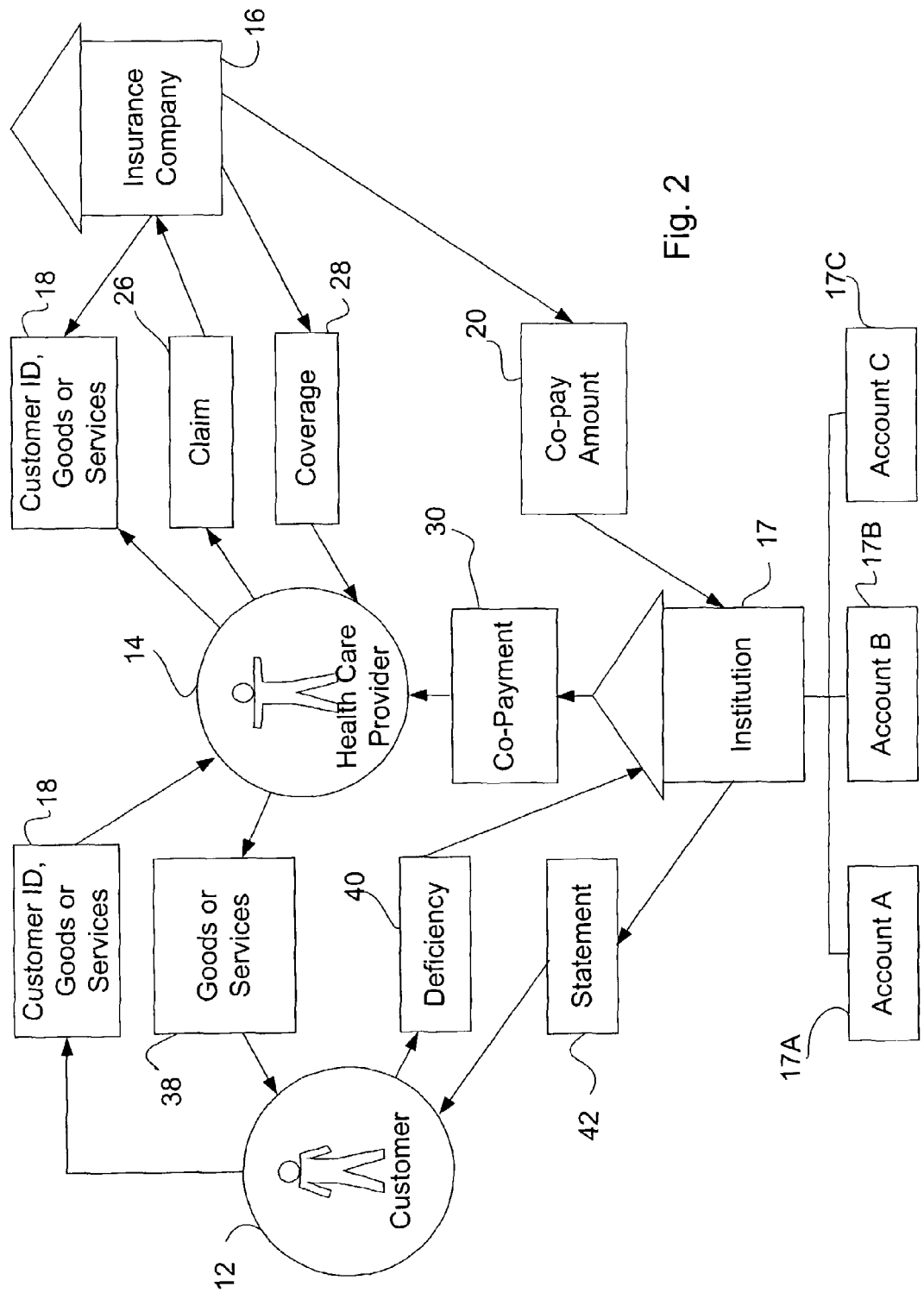
FIG. 2 is a work flow diagram showing the present invention providing payment for a healthcare good or service.

A schematic diagram of the present invention is shown in FIG. 2. Customer 12 requests a healthcare good or service from provider 14. Customer 12 communicates the good or service needed and the customer's health insurance information 18 to provider 14. Provider 14 then contacts insurance company 16 to determine the eligibility of the customer for health insurance benefits by communicating the good or service requested and customer information 18. Insurance company 16 communicates to institution 17 co-payment amount 20 required from the customer for the requested good or service. Institution 17 then deducts the co-payment 30 from one of a plurality of accounts 17A, 17B, 17C. These accounts may be checking accounts, savings accounts, credit or debit card accounts, an FSA, an HRA, or any other financial account known in the art. Any number of accounts may be designated by the consumer to provide funds for healthcare expenses. The co-payment is deducted from the highest priority account that contains available funds. (The priority and identity of the accounts is set by the customer in step 110 below.) If the highest priority account contains insufficient funds to cover the co-payment, the deficiency is deducted from the next highest priority account. If the combination of all the accounts does not contain sufficient funds to pay the co-payment, deficiency amount 40 is recorded for that customer. (The customer must provide deficiency 40 to the institution.) The provider supplies the good or service 38 to the customer. The provider files claim 26 with the insurance company to receive coverage 28, the portion of the expense covered by the insurance company. The co-payment 30 is transferred to the provider by the institution. Thus, if there are sufficient funds in an FSA, the funds come directly from that account. The customer does not have to save any receipts and wait to be reimbursed. This creates a time and cost savings for the customer and the employer, who must pay the third party administrator to operate the current system. In one embodiment, statement 42 is communicated to the customer periodically to inform them how much was deducted from each account, and how much remains in each account.

Figure 3:
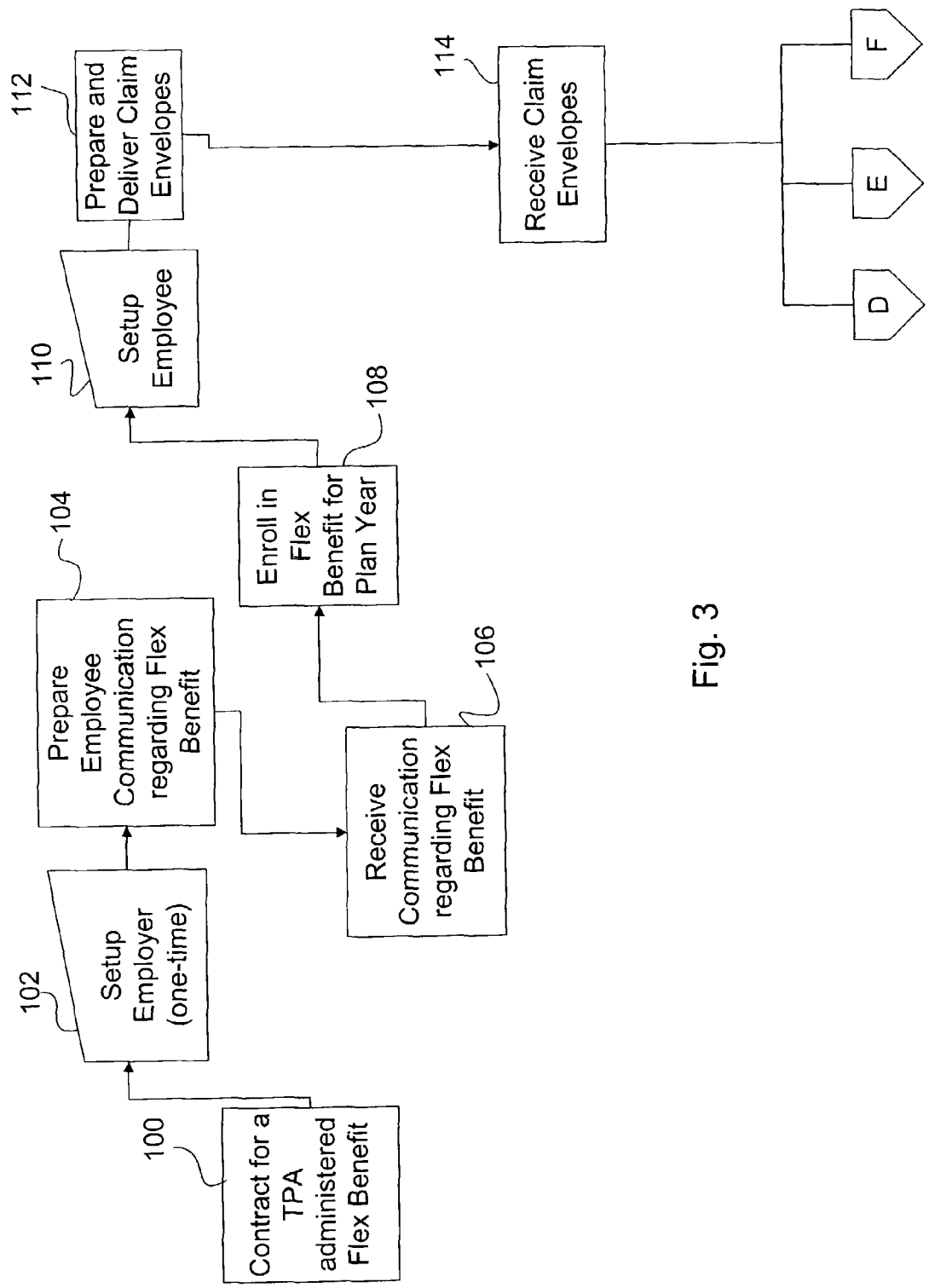
FIG. 3 is a flow chart showing the initial configuration of the present invention.

FIG. 3 illustrates the steps to allow a new employer and a new employee to practice a preferred embodiment of the present invention. In step 100, the employer contracts to practice the present invention. General purpose computers programmed to practice the present invention are configured to include the employer in step 102. The employer decides whether or not to offer HRAs and/or FSAs to its employees, and what priority these accounts would have. A communication is prepared in step 104 that explains the benefits available to each employee of the employer. This communication is sent to an employee in step 106. If desired, the employee enrolls in step 108. During enrollment (step 110), the employee will determine: whether or not to enroll in an FSA and/or and HRA, which personal accounts (i.e. checking, savings, credit card) healthcare funds are to be deducted from, and the priority of those accounts. Any authorization needed to allow charges to these accounts, such as preauthorization for a credit card account, would be performed at enrollment. After the employee is enrolled, claim envelopes are prepared and sent to the employee (step 112). The employee receives the envelopes and is prepared to participate in step 114. This allows an employee to mail or fax in receipts if desired, or to use the automatic payment capability of the present invention.

Figure 4:
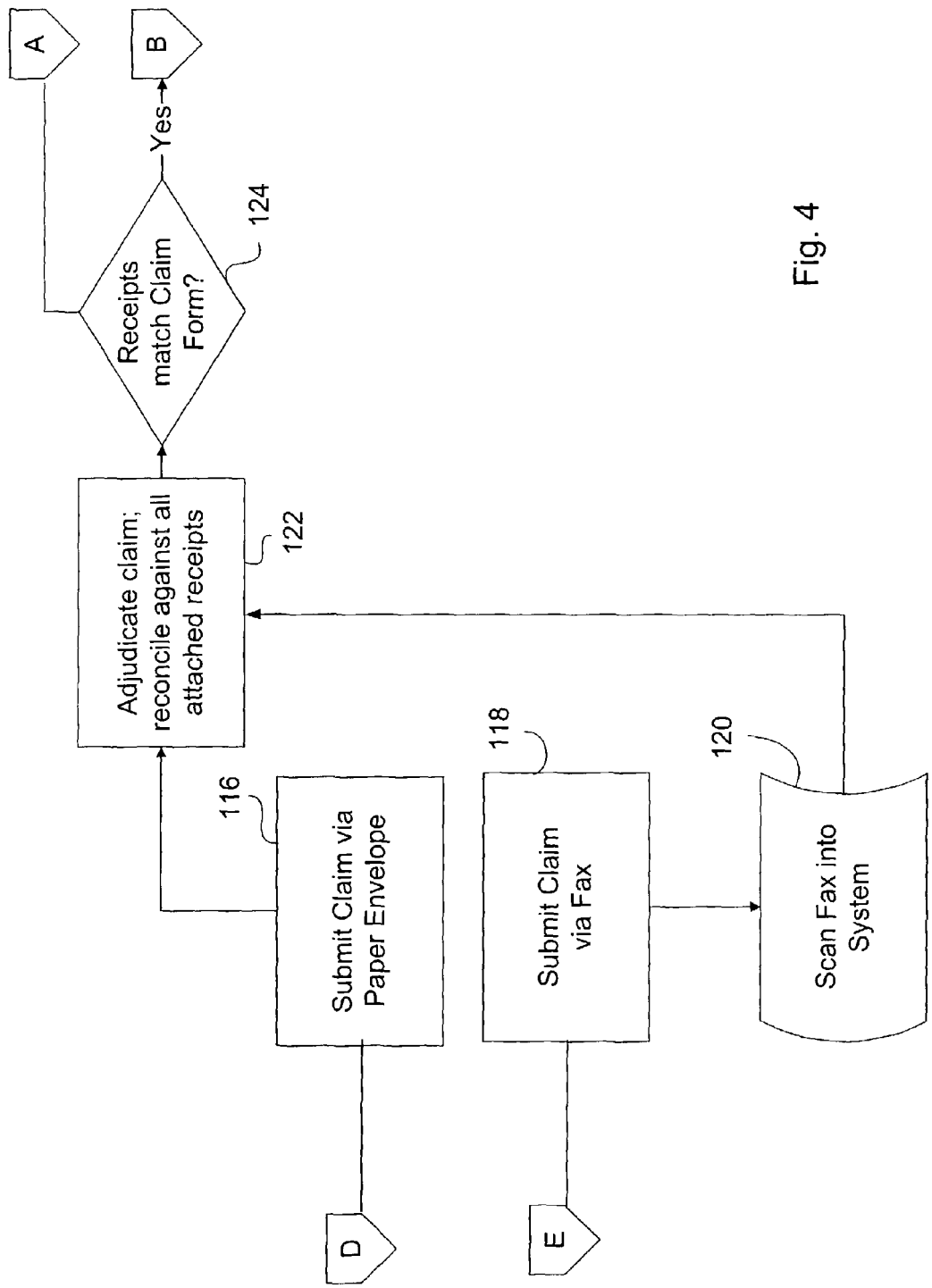
FIGS. 4 and 5 comprise a flow chart showing the processing of a claim submitted by fax or mail.
Figure 5:
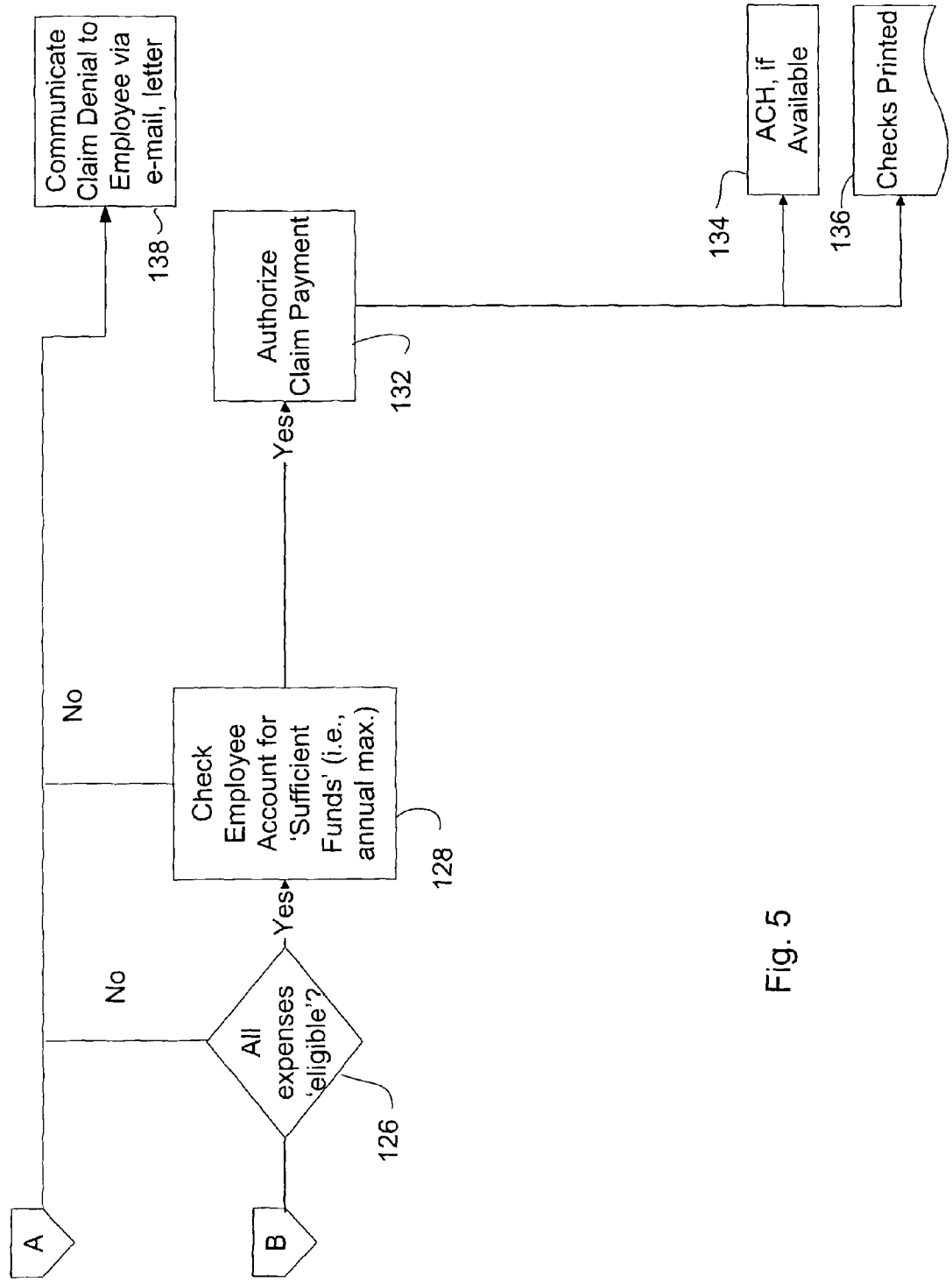

FIGS. 4 and 5 illustrate a consumer filing a claim by mail (step 116) or by facsimile (step 118). A faxed claim is scanned into the general purpose computer in step 120. The claim is adjudicated in step 122 by determining the co-payment required for the requested good or service. This decision is based on the receipts attached to the mailed or faxed claim. If the receipts match the claim (step 124), then the expenses are evaluated to determine if they are eligible (i.e. they are for healthcare goods or services) (step 126). If the expenses are eligible, the employee accounts are checked to ensure sufficient funds are available (step 128). If so, claim payment is authorized in step 132. The funds can be transferred electronically through an automated clearinghouse (ACH) (step 134), or a paper check can be printed (step 136). If the receipts do not match the claim form submitted, if the expenses are not healthcare expense, or if there are insufficient funds, then the claim is denied. The claim denial is communicated to the employee in step 138.

Figure 6:
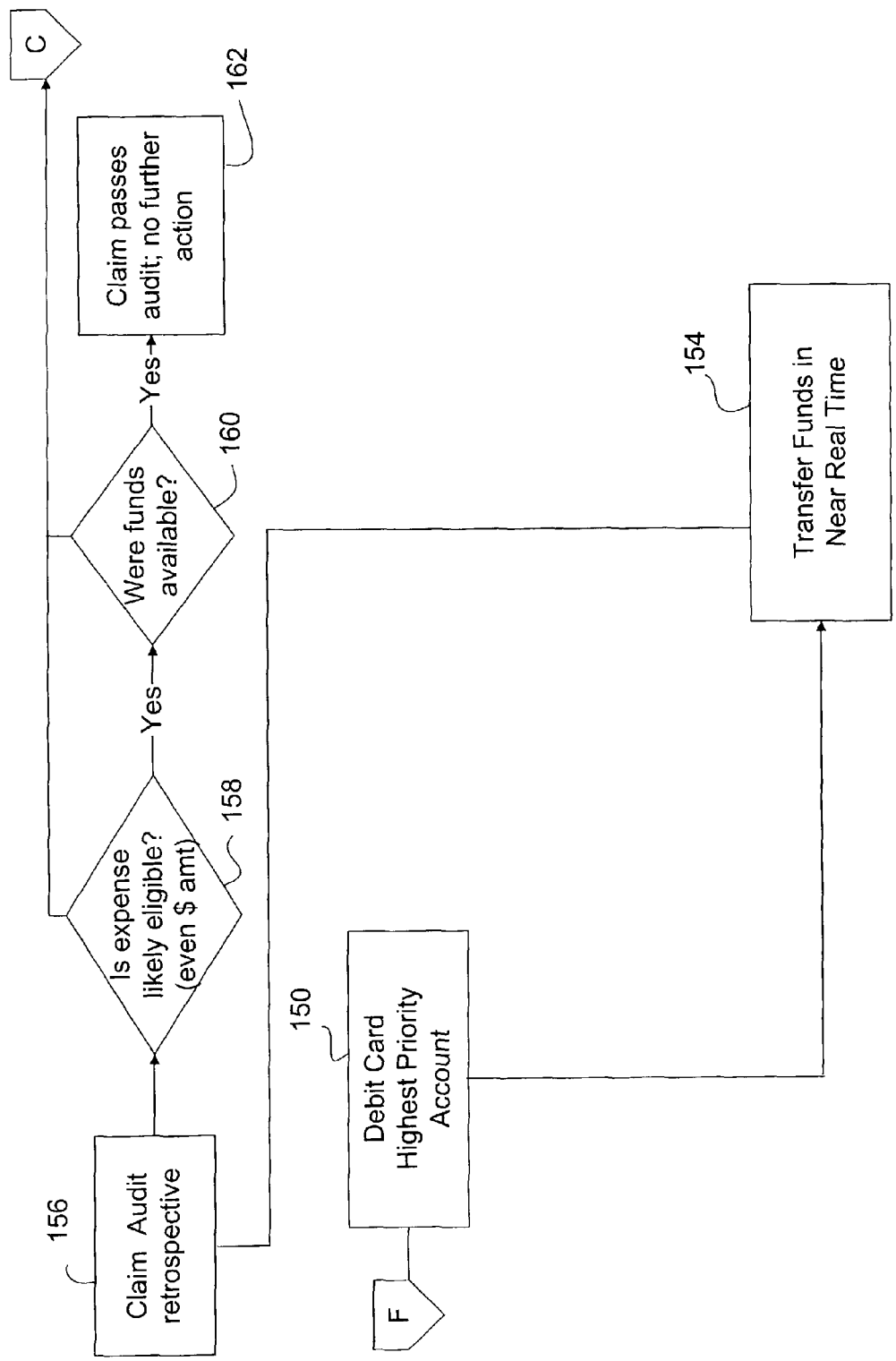
FIGS. 6 and 7 comprise a flow chart showing the processing of a claim wherein a debit card is the only enabled account; and, FIG. 8 is a flow chart showing the administrative steps for maintaining the claim database of the present invention.
Figure 7:
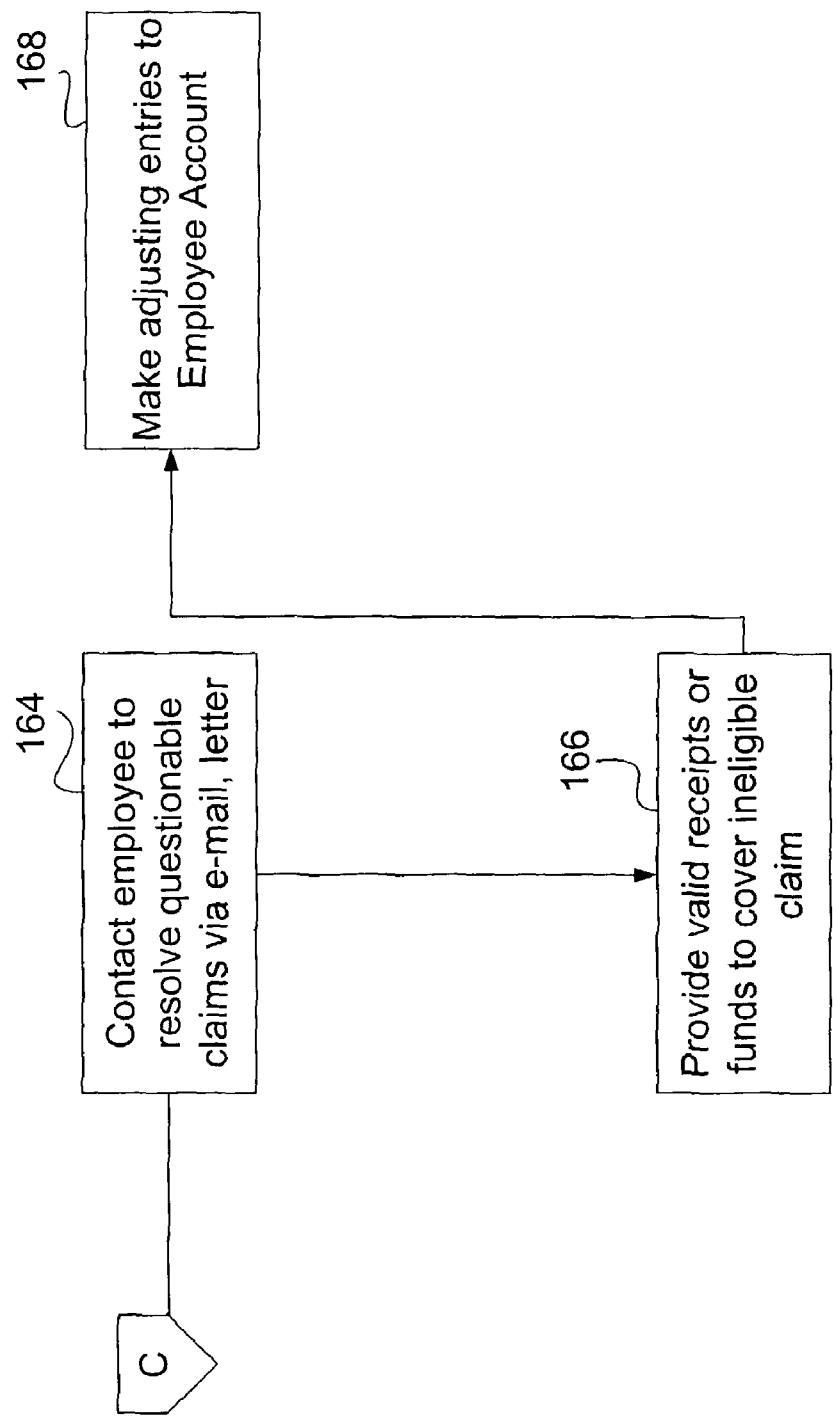

FIGS. 6 and 7 illustrate the method of the present invention where the only account enabled by a consumer is a debit card account. The highest priority account, in this case for a debit card, is identified in step 150. The debit card is charged the co-payment in step 154. The invention audits the claims after they have been paid to ensure they are eligible expenses (step 156). This involves determining if the claim was for an even dollar amount (step 158). If so, it is determined whether or not funds were available (step 160). If so, the claim passes the audit (step 162). If the claim was not an even dollar amount, or if there was a deficiency, the claim fails the audit and the employee is contacted regarding the questionable claim (step 164). The employee then provides receipts to validate that the questioned expense was a healthcare expense, or funds to cover the deficiency (step 166). The general purpose computer programmed to practice the invention is then programmed to adjust the employee account to reflect the result of the audit (step 168).

Figure 8:
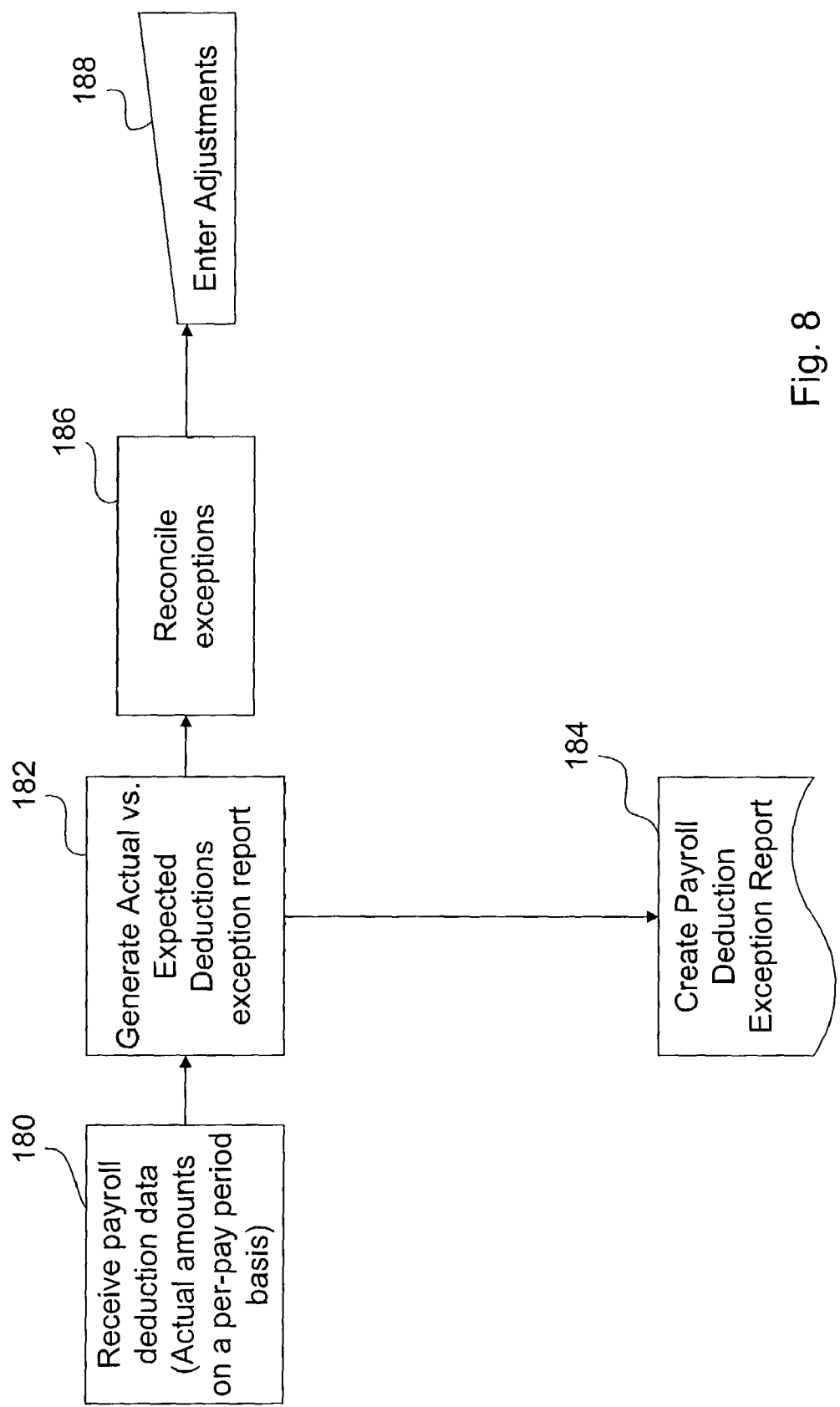

FIG. 8 illustrates maintenance functions that may be performed by the general purpose computer programmed to practice the invention. The computer receives payroll deduction data in step 180 to increment employee accounts. A report is then generated including the level of deductions of the employees (step 182). A payroll deduction exception report is created in step 184 to allow the employer and employee to spot inconsistencies with the desired and actual deduction levels. The exceptions are reconciled in step 186. Adjustments needed to the deduction levels are entered in step 188.

In a preferred embodiment, a report is periodically sent to each employee to communicate the status of each account. It should be readily apparent to one skilled in the art that this can be done by conventional mail, facsimile, electronic mail, or a website on the Internet.

The present invention includes an apparatus for coordinating payment for healthcare expenses including a general purpose computer for: prioritizing a plurality of accounts held by a customer based on respective predeterminations provided by the customer; receiving information including a co-payment amount based on the customer's insurance coverage;

determining availability of funds from the plurality of prioritized accounts; selecting from the plurality of prioritized accounts, based on the determination of availability of funds, a highest priority account or a highest combination of priority accounts having available at least a portion of the co-payment amount; and deducting the at least a portion of said co-payment from the selected highest priority account or highest combination of priority accounts having the at least a portion of the co-payment amount.

The present invention includes an apparatus for coordinating payment for healthcare expenses including a general purpose computer for: prioritizing a plurality of accounts held by a customer based on respective predeterminations provided by the customer; transmitting a customer's insurance information to said customer's insurance company; receiving information from said insurance company including a co-payment amount based on a customer's insurance coverage; determining availability of funds from the plurality of prioritized accounts; deducting at least a portion of said co-payment from a selected highest priority account or the highest combination of priority accounts in the plurality of prioritized accounts having the at least a portion of the co-payment amount; and calculating a deficiency, said deficiency equal to the co-payment amount minus the sum of the available funds in all of said customer's prioritized accounts.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. A computerized method for coordinating payment for healthcare expenses comprising a general purpose computer specially programmed to perform the steps of:
   prioritizing, using the general purpose computer, a plurality of accounts held by a customer based on respective predeterminations provided by the customer;
   receiving, using the general purpose computer, information including a co-payment amount based on the customer's insurance coverage;
   determining, using the general purpose computer, availability of funds from the plurality of prioritized accounts;
   selecting, using the general purpose computer, from the plurality of prioritized accounts, based on the determination of availability of funds, a highest priority account or a highest combination of priority accounts having available at least a portion of the co-payment amount; and
   deducting, using the general purpose computer, the at least a portion of said co-payment from the selected highest priority account or highest combination of priority accounts having the at least a portion of the co-payment amount.

2. The method recited in claim 1 wherein said plurality of prioritized accounts includes at least one of: a checking account, a savings account, a credit account, a flexible spending account, and a health reimbursement arrangement.

3. The method recited in claim 2 wherein said credit account is a credit card account.

4. The method recited in claim 1 wherein said healthcare expenses comprise prescription expense.

5. A computerized method for coordinating payment for healthcare expenses comprising a general purpose computer specially programmed to perform the steps of:
   prioritizing, using the general purpose computer, a plurality of accounts held by a customer based on respective predeterminations provided by the customer;
   receiving, using the general purpose computer, information including a co-payment amount based on the customer's insurance coverage;
   determining, using the general purpose computer, availability of funds from the plurality of prioritized accounts;
   deducting, using the general purpose computer, the at least a portion of said co-payment from a selected highest priority account or the highest combination of priority accounts in the plurality of prioritized accounts having the at least a portion of the co-payment amount; and
   calculating, using the general purpose computer, a deficiency, said deficiency equal to the co-payment amount minus the sum of the available funds in all of said customer's prioritized accounts.

* * * * *